United States Patent
Rubin

(10) Patent No.: US 6,480,142 B1
(45) Date of Patent: Nov. 12, 2002

(54) METHOD AND APPARATUS FOR MEASURING VELOCITY AND TURBULENCE OF ATMOSPHERIC FLOWS

(76) Inventor: William L. Rubin, 166-47 16th Ave., Whitestone, NY (US) 11357

( * ) Notice: Subject to any disclaimer, the term of this patent is extended or adjusted under 35 U.S.C. 154(b) by 0 days.

(21) Appl. No.: 09/860,019

(22) Filed: May 17, 2001

(51) Int. Cl.$^7$ ............................................. G01S 13/95
(52) U.S. Cl. .................. 342/26; 342/104; 342/107; 342/109; 342/110; 342/115; 342/118; 342/134; 342/135; 342/136; 342/137; 342/139; 342/147; 342/192; 342/195; 342/196
(58) Field of Search .................... 342/26, 27, 28, 342/104, 175, 192–197, 52, 53, 54, 59, 427, 105–116, 134–147; 73/170.11–170.15

(56) References Cited

U.S. PATENT DOCUMENTS

| | | | |
|---|---|---|---|
| 3,646,555 A | | 2/1972 | Atlas |
| 3,889,533 A | * | 6/1975 | Balser ..................... 73/170.13 |
| 3,940,769 A | * | 2/1976 | Sherman et al. ............. 342/427 |
| 4,219,887 A | * | 8/1980 | MacCready, Jr. .......... 342/26 X |
| 4,222,265 A | * | 9/1980 | Ravussin .................. 342/52 X |
| 4,649,388 A | | 3/1987 | Atlas |
| 4,761,650 A | * | 8/1988 | Masuda et al. ............... 342/26 |
| RE33,152 E | | 1/1990 | Atlas |
| 5,130,712 A | | 7/1992 | Rubin et al. |
| 5,208,600 A | | 5/1993 | Rubin |
| 5,544,525 A | * | 8/1996 | Peterman et al. ......... 73/170.13 |

* cited by examiner

Primary Examiner—Bernarr E. Gregory
(74) Attorney, Agent, or Firm—Seymour Levine

(57) ABSTRACT

A method and apparatus for measuring the parameters of atmospheric turbulent flows utilizes the Doppler shifted frequencies of received radar signals backscattered from sound generated aerodynamically by atmospheric turbulent flows. Doppler frequency bandwidths of the received backscattered signals are used to estimate the atmospheric flow turbulence and the mean frequency within a bandwidth is processed to estimate its radial flow velocity. Total flow velocity and the flow velocity angle with respect to the antenna boresight of the atmospheric turbulent flow may be estimated by estimating the radial flow velocity at two radial positions and processing these radial velocities. Processing of the Doppler data is initiated when the total signal power within the Doppler frequency band exceeds a predetermined power level.

28 Claims, 6 Drawing Sheets

METHOD AND APPARATUS FOR MEASURING VELOCITY AND TURBULENCE OF ATMOSPHERIC FLOWS

BACKGROUND OF THE INVENTION

1. Field of the Invention

The invention relates generally to the detection of weather disturbances and precursors to weather disturbances, and more particularly to the detection of clear air turbulence, microbursts, aircraft wake vortices, gust fronts, thunderstorms, updrafts, downdrafts, convective flows, tornadoes, hurricanes, and cyclones.

2. Description of the Prior Art

Clear air turbulence, microbursts, aircraft wake vortices, gust fronts, thunderstorms, updrafts, downdrafts, and convective flows all present severe hazards to aircraft. Effects on aircraft encountering any of these hazards range from severe buffeting to the ultimate catastrophe. Thunderstorms, tornadoes, hurricanes, and cyclones have been extremely destructive. Though these severe storms may be detected and tracked once they are formed, detecting precursors to their formation have not been implemented. Consequently, warnings of the initial onslaught of these storms cannot be given and loss of life may result at their initiation.

The prior art utilizes two basic techniques to detect hazardous atmospheric flows: Doppler radar and the Radio Acoustic Sounding System (RASS). Doppler radar measures the average radial motion of scatterers in a volume formed by a radar range gate and the antenna beam. Processed samples of the radar return yield the Doppler spectrum of the radar backscatter in each range gate. The zeroth moment of the signal spectrum is a measure of echo strength, the first moment a measure of the mean radial velocity, and the second moment a measure of the Doppler width. Doppler radar backscatter from hydrometeors (rain droplets) and dust are utilized to determine various atmospheric conditions. Doppler radars of the prior art, though useful for the determination of existing weather conditions, are not able to detect the clear air turbulences which are hazardous to aircraft in flight.

RASS emits overlapping radar and acoustic beams from a common ground-based location. Because the air's index of refraction is a function of density, the acoustic beam, which consists of a spatial pattern of condensations and rarefactions, produces corresponding refractive index variations in situ. Radar waves reflect from these index variations and reflections are strongest when the acoustic wavelength is one-half the radar wavelength. Radar reflections focus onto the radar antenna due to the parallel alignment of the radar and acoustic wavefronts. The Doppler shift of the radar reflections corresponds to the speed of sound.

A vertically pointing RASS has been utilized to measure the vertical temperature profile of the atmosphere by measuring the speed of sound as a function of altitude. Since the speed of sound has a known relation to temperature, a virtual temperature profile of the atmosphere may be deduced from the data. Due to atmospheric attenuation of the sound beam and very small radar reflections from clear air, RASS can measure sound speed, wind velocity, and clear air turbulence only within restricted bounds.

A horizontally pointing RASS has been used to detect, track, and measure the strength of wake vortices of landing aircraft. Segments of the RASS acoustic wave speed up or slow down by varying amounts as they pass through a vortex. As a result, the Doppler spectrum of the acoustically reflected radar signal is a mapping of the vortex's line-of-sight velocity distribution. Vortex circulation (strength) may be deduced from the Doppler spectrum.

A fluid flow is laminar when the velocity and direction of flow particles do not change with time. Laminar flow is favored by flows with a low Reynolds number, a dimensionless quantity defined as $R=LU/\gamma$, where L is a characteristic length of the flow, U is a characteristic speed, and $\gamma$ is the fluid kinematic viscosity. A laminar flow with a high Reynolds number is unstable, so that a slight disturbance changes the flow to turbulent. A turbulent flow consists of overlapping eddies with varying characteristic lengths and velocity scales. First order eddies comparable to the size of the flow appear first. First order eddies generate second order eddies which are smaller and draw their energy from the first. Second order eddies generate third order eddies, and so on, creating a hierarchy of eddies. The smallest eddies have high local velocity gradients which cause them to dissipate under the influence of viscosity and their kinetic energy to be converted into heat.

An eddy may be described as a swirling flow with approximately circular streamlines. Streamline velocities increase linearly from zero at the center to a maximum value, after which they decrease inversely with radius. The eddy core is defined as the region inside the maximum velocity streamline, that fluctuates due to turbulence. Eddy overall size varies from 10 to 30 times the mean core size. FIG. 1A shows the process by which large eddies produce smaller eddies. A kink induced in an eddy's core by turbulence causes the core to twist into a figure 8. Opposing core flows cause the core to split, culminating in the creation of two eddies with opposite rotation.

Small scale turbulence is essentially homogeneous and isotropic, and may be mathematically described by Fourier eigenfunctions (modes) indexed by wave numbers k, which are related to eddy core size. Mode wave number space may be divided into three ranges, each having its own wave number distribution: (i) low wave numbers (production range); (ii) intermediate wave numbers (inertial range), and (iii) high wave numbers (dissipation range). Eddy wave numbers in the production range are distributed as $k^4$ and in the inertial range as $k^{-5/3}$. Hence, wave numbers on the boundary between the production and inertial ranges have the highest density.

Atmospheric flows typically have high Reynolds numbers and are always turbulent. The size of the largest eddies in the normally turbulent atmosphere are tens of meters while the smallest are several centimeters. Clear Air Turbulence (CAT) refers to a highly turbulent clear air flow that occurs about 10 km above the earth's surface. Theoretical considerations and observations of the free atmosphere indicate that CAT is mainly a manifestation of stably stratified shear flow instability, generally referred to as Kelvin-Helmholtz instability or KHI. Onset of KHI over an atmospheric layer of depth $\Delta z$ is determined by the layer Richardson number which is inversely proportional to the square of the vector wind change over $\Delta z$. A necessary condition for KHI is a Richardson number less than 0.25.

CAT turbulence is severe enough to perturb the motion of aircraft flying through it, causing injuries to passengers and cabin attendants as well as structural damage to aircraft. CAT can be neither seen nor avoided by pilots without prior knowledge of its location. The largest eddies in CAT may be several kilometers, corresponding to the flow size. Flow velocities typically range from 100 to 200 kts (50 to 100 m/s).

The two well-known mechanisms by which kinetic energy is converted into sound are, first, by forcing a mass in a fixed region of space to fluctuate, as with a loudspeaker diaphragm embedded in a very large baffle, and second, by forcing momentum in a fixed region of space to fluctuate, which occurs when a solid object vibrates after being struck. The first is more efficient than the second.

Localized fluctuations in turbulent flows produce pressure variations that propagate away from their source and, if an observer is present, will be recognized as sound. Examples include the roar produced by high winds, the noise emitted by jet aircraft exhaust flows, and the whooshing sound produced by aircraft wake vortices. The mechanism by which sound is generated aerodynamically is fundamental because fluctuating shearing motions are converted into fluctuating longitudinal motions. The conversion efficiency is much smaller than either of the above mechanisms.

It has been shown that there is an exact mathematical analogy between density fluctuations in a turbulent flow and density fluctuations produced by fluctuating quadrupoles in a non-moving medium. A quadrupole consists of two correlated, opposite polarity, dipoles whose axes are aligned in one direction and whose physical positions may be aligned in another. A quadrupole is longitudinal when the two directions coincide and lateral when perpendicular. Every quadrupole can be described in terms of longitudinal and lateral quadrupoles.

It has been further shown that quadrupoles radiate sound because density fluctuations generated by a quadrupole's constituent dipoles do not arrive simultaneously in the far field. Stated mathematically, quadrupole sound radiation is due to the rate of change of dipole strength at a point in the far field even though total dipole strength in the near field is zero at any instant. Referring again to FIG. 1A, it may be seen that the newly split core constitutes two dipoles with opposite polarities, i.e. a quadrupole. Thus, the same mechanism that splits an eddy core simultaneously creates a quadrupole that radiates sound until the constituent dipoles decorrelate.

Flow generated sound power $F_s$ radiating through a surface of dimension $l^2$ may be represented by $(F_s = \rho v^8 v_s^{-5} l^2)$, where $\rho$ is the medium density, $v$ is the flow velocity, and $v_s$ is the speed of sound. Since flow kinetic energy $F_k$ entering a region is given by $(F_k = \rho v^3 l^2)$, the sound conversion efficiency is proportional to $M^5$, where $(M=v/v_s)$ is the flow Mach number. Conversion efficiency at low Mach numbers is exceptionally small, resulting in very little radiated sound.

Flow transport modifies a quadrupole's radiation pattern only for significant flow Mach numbers. For example, in a Mach 0.2 flow, a longitudinal quadrupole's sound intensity increases slowly from 0 dB at 90 degrees (relative to the flow) to +5 dB at 0 degrees; and decreases from 0 dB at 90 degrees to −3 dB at 180 degrees. In the case of lateral quadrupoles, sound radiated at 135 degrees is the 0 dB reference. Between 0 and 90 degrees, directionality is similar to a positive half sine wave with a peak value of 4 dB near 40 degrees. Between 90 and 180 degrees the curve shape is also similar to a half sine wave with a peak of −2 dB near 130 degrees. There are sharp nulls at 0, 90, and 180 degrees. For lower Mach number flows, the radiation pattern is essentially non-directional, especially since quadrupoles not only have random orientations but radiated waves are also randomly refracted passing through adjacent large eddies.

Numerous laboratory measurements of sound produced by small jets confirm the above. FIG. 1B shows radiated spectra for various jet diameters and velocities as a function of the product $(fD/U_J)$, sometimes known as the Strouhal number, where f is the radiated acoustic frequency, D is flow size, and $U_J$ is flow velocity. In this figure, spectral curves from different sources were slightly shifted to the left or right to make all spectral peaks occur at a Strouhal number of one. It may be noted that spectral shapes are essentially the same for widely different flows, suggesting that FIG. 1B also applies to sound spectra radiated by atmospheric flows.

The shape of the normalized spectrum may be explained as follows. At Strouhal numbers less than one, the radiated intensity varies as the fourth power of frequency due to the Stokes effect. At Strouhal numbers greater than one, the radiated power depends on quadrupole spatial density in the inertial range so that intensity decreases at 5 dB/octave (5/3×10 log 2).

FIG. 1C shows spectra radiated by a 25 mm jet for three jet velocities in an anechoic chamber. The peak frequency radiated by a 125 m/s (250 kt) jet is about 4.5 kHz. This contrasts with a peak frequency of 78 Hz generated by a 35 kt wind measured at the top of Mount Washington (NH). The measured wind spectrum was also found to decay at 5 dB/octave above the peak.

The boundary between the inertial range and the dissipation range is often referred to as the microscale. Quadrupole sizes near the microscale radiate the highest frequencies. In the normally turbulent atmosphere the radiated spectrum extends to roughly 10 kHz. Since the microscale decreases with increasing turbulence, CAT sound spectra are expected to extend to above 30 kHz.

The lifetimes (correlation times) of quadrupole radiation may be deduced from the characteristic time scale T≈L/U, of a turbulent flow, where L and U are characteristic length and velocity scales of the flow. Since CAT flow sizes are of the order of a kilometer and flow velocities of the order of 50–100 m/s, the flow time scale, and therefore also the lifetime of the largest quadrupoles, is about 10 seconds. Assuming characteristic time scales of small scale CAT turbulence to be two orders of magnitude lower, the lifetime of the smallest quadrupoles (highest frequencies) is around a tenth of a second. Near the earth's surface, the smallest eddies are several times larger than those in CAT, resulting in quadrupole lifetimes of the order of several tenths of a second.

In a fully turbulent flow, first order eddies approximately fill the flow volume without overlap. Because eddies in the production range are distributed as the fourth power of eddy size, higher order eddies increasingly overlap until the boundary between the production and inertial ranges is reached, after which eddy size density decreases. Assuming a first order CAT eddy size of 4800 m and a most populous CAT eddy size of 1200 m (with a 60 m core that produces a peak radiated frequency of 5 Hz), the number of overlapping 1200 m eddies is about 256. Hence, 4.7 m eddies (1200 m/256) fill the volume without overlap. Assuming a 4.7 m eddy core size of 0.16 m, the spatial density of 0.16 m eddy cores relative to 1.5 cm cores (corresponding to a radiated frequency of 20 kHz) is about 3.7 so that the average spacing between 1.5 cm quadrupoles is approximately 17 m.

As stated above, existing radar techniques for detecting hazardous atmospheric flows and precursor flows require embedded hydrometeors and/or dust to generate a detectable radar return. It is desirable to detect and measure the velocity and turbulence of clear air flows remotely, as well as those containing embedded hydrometeors and/or dust, which not only fills a void in present capabilities, but also permits early detection of clear air flows that are precursors to many hazardous weather disturbances.

SUMMARY OF THE INVENTION

It is the objective of the present invention to detect and measure the velocity and turbulence of hazardous atmospheric flows including CAT, microbursts, aircraft wake vortices, gust fronts, thunderstorms, updrafts, downdrafts, convective flows, tornadoes, hurricanes, and cyclones using ground, airborne, and space-based means.

An object of the invention is to detect CAT from onboard an aircraft in flight.

Another object of the invention is to detect microburst downflows and outflows (including dry microbursts) at airports using ground and onboard aircraft means.

A further object of the invention is to detect, track, and measure aircraft wake vortices at airports.

A still further objective of the invention is to eliminate radar ambiguity in the measurement of hazardous wind velocities by Doppler weather radar.

A still further object of the invention is to detect atmospheric flows relating to thunderstorms, tornados, hurricanes, and cyclones.

All of the above objects are achieved by the measurement of the Doppler shift and Doppler width of radar signals reflected from refractive index variations produced by sound waves generated within atmospheric flows. For reflection to occur, the sound wavefronts must be parallel to the radar wavefronts and also satisfy the Bragg condition. Since aerodynamically generated sound has a wide spectrum and is essentially non-directional, radar wavefronts across the entire radar beam are reflected towards the radar. This is true for acoustic waves traveling towards as well as away from the radar.

BRIEF DESCRIPTION OF THE DRAWINGS

The foregoing objects and advantages will become more fully understood from the Description of the Preferred Embodiments with reference to the drawings wherein.

DESCRIPTION OF THE PREFERRED EMBODIMENTS

CAT can be detected at 30,000 feet altitude by a Doppler radar, constructed in accordance with this invention, on board an aircraft at distances exceeding 100 miles. To resolve range and Doppler ambiguities, CAT detection and ranging are performed sequentially.

Radar signals backscattered from a CAT volume will center around two Doppler frequencies corresponding to sound approaching the aircraft (+speed) and sound receding from the aircraft (−speed). Both frequencies are far removed from the Doppler shifts of ground clutter, hydrometeors, and most other radar targets. The radar signals received at the aircraft, at each of these Doppler frequencies, are backscattered from aerodynamically generated acoustic waves travelling in opposite directions. These radar signals are in general uncorrelated and may be independently detected.

Figure 2:
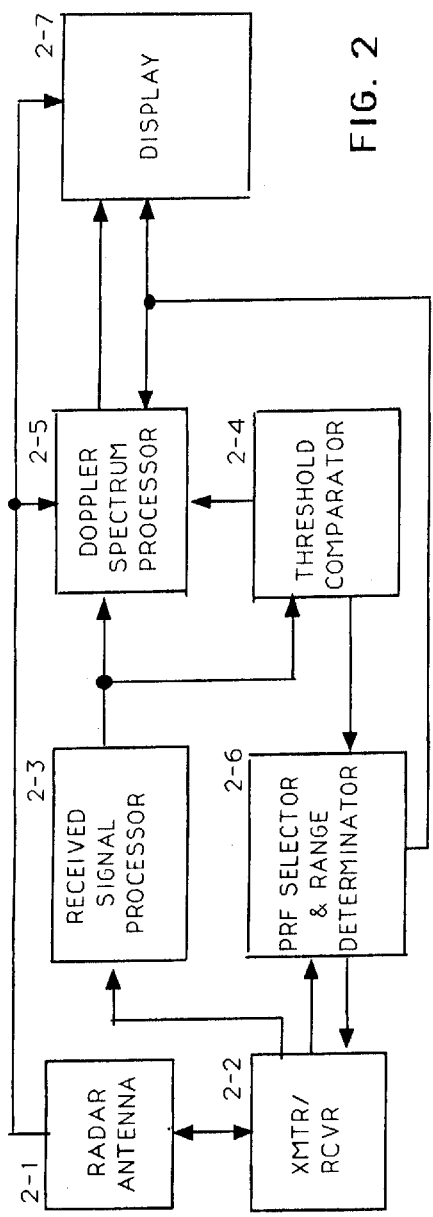
FIG. 2 is a block diagram of a preferred embodiment of the invention.

Refer now to FIG. 2. An antenna 2-1 radiates signals coupled thereto from a transmitter/receiver 2-2, which is preferably coherent, and couples backscattered signals incident thereto to the receiver part of the transmitter/receiver 2-2. Received signals are coupled from the receiver to a received signal processor 2-3, wherein the signals are processed to determine the Doppler frequencies with the highest amplitudes in each of two Doppler bands, one centered on the Doppler frequency corresponding to approaching sound waves and the second centered on the Doppler frequency corresponding to receding sound waves relative to the aircraft. Signal processor 2-3 also computes the signal power contained in each of the two Doppler bands, the spectral width of the frequency band, and the mean frequency of the band. The signal power computed for each band is coupled from the received signal processor 2-3 to a threshold comparator 2-4. The computed signal power in each of these Doppler bands result from approaching and receding sound waves. When the signal power in at least one of the Doppler frequency bands exceeds a predetermined threshold set in the threshold comparator 2-4, a CAT alarm is sounded and the Doppler signals are coupled from the received signal processor 2-3 to a Doppler spectrum processor 2-5 which is enabled by the threshold comparator 2-4. Antenna pointing directions and range to the turbulence are also coupled to Doppler spectrum processor 2-5. If radar return in only one Doppler band exceeds the threshold in comparator 2-4, Doppler data coupled from the received signal processor 2-3 are processed in the Doppler spectrum processor 2-5 to determine the mean and the spectral width of the Doppler band containing the signal that exceeded the threshold. Doppler spectrum processor 2-5 converts the computed mean into an estimate of radial flow velocity m the CAT volume and the computed spectral width into an estimate of air flow turbulence. If radar return in both Doppler bands exceed the threshold in threshold comparator 2-4, Doppler data coupled from the received signal processor 2-3 are processed in the Doppler spectrum processor 2-5 to determine the mean and the spectral width of radar return in each of the two Doppler bands. Doppler spectrum processor 2-5 averages the two computed spectral widths and converts the average into an estimate of air flow turbulence. Further, Doppler spectrum processor 2-5 computes the algebraic sum of the two mean Doppler frequencies and converts this number into an estimate of radial flow velocity in the volume. Estimating radial flow velocity at two known azimuth antenna angles permits total air flow velocity and flow angle with respect to the antenna boresight to be computed. When either one or both thresholds are exceeded, threshold comparator 2-4 also couples a trigger to a PRF selector and range determinator 2-6. This trigger causes the PRF selector to alter the pulse repetition rate of the transmitted signal, if required, to provide PRFs from which unambiguous Doppler frequencies and range to the turbulence may be determined. Turbulence, radial flow velocity, and total flow velocity and flow angle with respect to the antenna boresight are coupled from the Doppler spectrum processor 2-5 to a display 2-7, to which antenna pointing directions and range to the turbulence are also coupled, in which the CAT parameters are displayed versus range and pointing angle.

The velocity of sound in air varies with temperature and pressure. At 0° C. the velocity of sound is 331.4 m/s on the earth's surface and about 300 m/s at 30,000 feet. The atmosphere at 30,000 feet is acoustically lossless for the same reasons the arctic circle is acoustically lossless, namely, very low temperatures and zero moisture. The spectrum of sound radiated by high velocity atmospheric flows at 30,000 feet stretches from below 1 Hz to over 30 kHz. Near the ground, where atmospheric flow velocities are typically lower, the upper limit is closer to 10 kHz.

As stated above, maximum radar reflection occurs when the acoustic wavelength equals one-half the radar wavelength. The acoustic wavelength is generally referred to as the Bragg wavelength and the radar return as Bragg backscatter. Bragg backscatter will be detectable at high altitudes for radar frequencies extending from HF through X-band and beyond. Near the ground, acoustic backscatter will be detectable only for radar frequencies whose corresponding Bragg frequencies have low atmospheric attenuation.

At high altitudes, sound waves will propagate outside the CAT region, resulting in a radar detectable sound halo surrounding the CAT region. In the halo closest to an approaching aircraft, backscatter at the more positive Doppler frequency will be stronger. The reverse is true in the halo on the far side. The halos help to define the near and far edges of the CAT region when ranging is performed. Halo width is not likely to be large since emerging acoustic waves will be refracted by vertical wind shear and/or temperature variations.

For a stationary radar the Bragg frequency that corresponds to the Bragg wavelength is equal to the backscatter Doppler shift. Consider a Bragg frequency $f_B$ corresponding to Bragg wavelength $\lambda_B$, and a radar frequency $f_{RF}$ corresponding to radar wavelength $\lambda_{RF}$. As previously stated, the Bragg acoustic wavelength is equal to one half the radar wavelength: $(\lambda_B = \frac{1}{2}\lambda_{RF})$. The Bragg and RF wavelengths are respectively: $(\lambda_B = v_S/f_B)$ and $(\lambda_{RF} = c/f_{RF})$, where $v_S$ is the acoustic velocity towards the radar and c is the speed of light. It follows that $[f_B = (2v_S/c)f_{RF} = 2v_S/\lambda_{RF}]$. This is also the expression for the Doppler shift from a reflecting object moving at radial velocity $v_S$ with respect to the radar. Thus, $(f_B = f_D = 2v_S/\lambda_{RF})$.

Similarly, when the radar is airborne, the Bragg frequency is also equal to the Doppler frequency of the Bragg backscatter. In this case the radar Doppler frequency is calculated by adding the radar antenna velocity to the acoustic velocity, yielding the Bragg frequency $f_{B1}$ towards the radar antenna and the Bragg frequency $f_{B2}$ away from the radar antenna:

$$f_{B1} = f_{D1} = 2(v_s + v_{ac})/\lambda_{RF}$$

$$f_{B2} = f_{D2} = 2(-v_s + v_{ac})/\lambda_{RF}$$

The Doppler frequency for ground clutter received by an airborne radar at long ranges is in the vicinity of $(2v_{ac}/\lambda_{RF})$, which differs from the Bragg Doppler frequencies by $(+2v_s/\lambda_{RF})$ for acoustic waves approaching the radar antenna and $(-2v_s/\lambda_{RF})$ for acoustic waves receding from the radar antenna, thereby permitting Bragg return to be readily detected in the presence of ground clutter return.

The signal-to-noise ratio (S/N) for Bragg return at each Doppler frequency may be determined as follows. The reflection coefficient $\Gamma_B$ for Bragg backscatter is given by:

$$\Gamma_B = \sqrt{2}\pi(D/\lambda_{RF})\Delta n$$

where D is the radar range bin width, $\lambda_{RF}$ is the radar wavelength, and $\Delta n$ is the rms refractive index of modulation imparted by acoustic excitation. This expression is valid for an acoustic wave that is coherent over a radar range bin. When the acoustic coherent length is shorter than the radar range bin width, the reflection coefficient is given by:

$$\Gamma_B \cong \sqrt{2}\pi(d^{1/2}L_{coh}/\lambda_{RF})\Delta n$$

where D is replaced by $(d^{1/2}L_{coh})$, $L_{coh}$ is the interval over which the acoustic wave is coherent, and d is a dimensionless scalar equal to $(D/L_{coh})$.

The index of refraction of air at microwave frequencies, denoted by n, is closely given by:

$$n = 1 + (77.6 p/T) \times 10^{-6}$$

where T is the absolute temperature in degrees Kelvin and p is the barometric pressure in millibars. Sound pressure is typically measured in dynes/cm². The reference sound pressure level of 0 dB is defined as 0.0002 dynes/cm². Hence any other sound pressure p can be written as:

$$p = 0.0002 \times 10^{P/20} \text{ dynes/cm}^2$$

where P is dB above 0.0002 dynes/cm². Since 1 millibar is approximately equal to 1000 dynes/cm², sound pressure in millibars becomes:

$$p = 2 \times 10^{(P/20)-7} \text{ millibars}$$

The rms refractive index of modulation may then be written as:

$$\Delta n (155.2 \times 10^{(P/20)-13})/T$$

At 30,000 feet, $T \approx 243°$ K $(-30°$ C.$)$ in which case:

$$\Delta n = 6.387 \times 10^{(P/20)-14}$$

The expression for radar reflection coefficient $\Gamma_B$ then becomes:

$$\Gamma_B = 2.838 \times 10^{(S/20)-13} d^{1/2} (L_{coh}/\lambda_{RF})$$

and $$|\Gamma_B|^2 = 8.052 \times 10^{(S/10)-26} d(L_{coh}/\lambda_{RF})^2$$

where S is the sound pressure in dB responsible for generating the Bragg backscatter. To determine S, both the sound pressure spectral density s around the Bragg frequency and the spectral width of Bragg backscatter must be known. The Bragg width may be determined as follows. As above, let $\lambda_B$ correspond to the Bragg wavelength. Then $(M = L_{coh}/\lambda_B)$ is the number of Bragg wavelengths encompassed within $L_{coh}$. Increasing the number of wavelengths in $L_{coh}$ by one produces a Bragg echo null. It is equivalent to distributing 360° of Doppler phase shift over $L_{coh}$ and summing. Let $\lambda_N$ correspond to the wavelength that results in a null. Then, $[M\lambda_B = L_{coh} = (M+1)\lambda_N]$. From this relation, it may be readily verified that the difference $\Delta f$ between the first null frequency $f_N$ and the Bragg frequency $f_B$ is:

$$f_B - f_N = \Delta f = v_S/L_{coh}$$

where $v_S$ is again the velocity of sound. Frequency difference $\Delta f$ is a function only of sound velocity $v_S$ and coherent width $L_{coh}$ and is independent of the Bragg frequency and the radar carrier frequency. Frequency difference $\Delta f$ defines the separation between the peak Bragg Doppler frequency and the first spectral null. It is also approximately equal to the 3 dB Bragg spectral width.

Knowledge of the Bragg bandwidth $\Delta f$ permits S to be replaced by:

$$S = s + 20 \log \Delta f$$

where, as stated above, s (dB/Hz) is the sound pressure density generated by the turbulent flow in the vicinity of the Bragg frequency. Substituting for S, $$|\Gamma_B|^2 = 8.052 \times 10^{(s/10)-26} d(L_{coh}/\lambda_{RF})^2 (\Delta f) = 8.052 \times 10^{(s/10)-26} d(v_s/v_{RF})^2$$

A radar antenna with a circular aperture of diameter $D_{ant}$ will have a half power beamwidth, measured in radians, of $(\lambda_{RF}/D_{ant})$. Thus, the surface area covered by the beam at a distance R from the antenna will have a diameter $(R\lambda_{RF}/D_{ant})$ at radar distance R. Assuming the acoustic range correlation interval is also equal to $L_{coh}$ in width and height, the Bragg signal received by the radar will consist of N uncorrelated Bragg returns that add powerwise at the radar antenna, where N is given by:

$$N = (R\lambda_{RF}/D_{ant}L_{coh})^2$$

Since the fraction of radar power incident on each correlated area is (1/N), by duality, the fraction of power received by the radar antenna from each correlated area is the same. Hence, the total energy $E_{RFL}$ received by the radar antenna for peak radar power $P_t$ and for a transmitted pulse $\tau_p$ is given by:

$$E_{REFL} = 8.052 \times 10^{(s/10)-26} P_t \tau_p d(v_s/\lambda_{RF})^2 (1/N) = 8.052 \times 10^{(s/10)-26} (P_t \tau_p DL_{coh}/\lambda_{RF}^4)(v_s D_{ant}/R)^2$$

S/N out of a filter matched to a single pulse is given by $(2E/N_o)$. From the above, the S/N out of a matched filter is given by:

$$S/N = 1.61 \times 10^{(s/10)-25} (P_t \tau_p DL_{coh}/\lambda_{RF}^4 N_o)(v_s D_{ant}/R)^2$$

FFT processing increases the single pulse S/N by a number equal to the FFT size:

$$[S/N]_o = 1.61 \times 10^{(s/10)-25} (P_t \tau_p DL_{coh}/\lambda_{RF}^4 N_o)(v_s D_{ant}/R)^2 \times FFT$$

(Radar losses must be added to this equation.)

To evaluate this expression, values of its elements must first be determined. Sound pressure P may be determined by the formula:

$$P = 90 + 10 \log(\rho v^3 M^5 l^2) \, dB$$

This calculation yields a total sound pressure of 139.5 dB for air density $\rho = 1.293 \times 10^{-3}$ g/cm$^3$ and a CAT air flow velocity of 60 m/s, (M = v/v$_s$ = 0.2), flowing through a surface (l$^2$ = 1 cm$^2$).

Figure 1A:
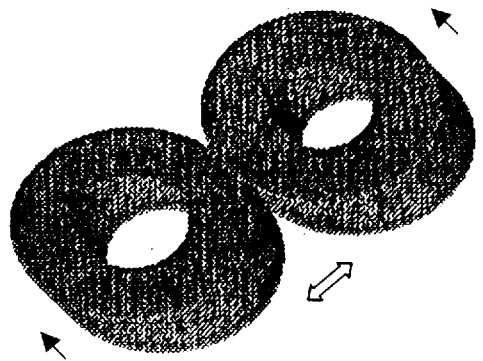
FIG. 1A is an illustration of quadrupole creation causing acoustic radiation.
Figure 1A:
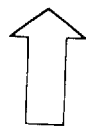
Figure 1A:
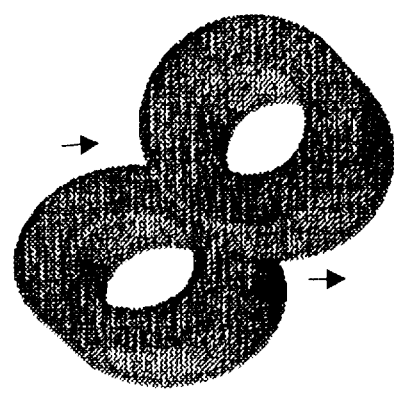
Figure 1A:
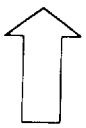
Figure 1A:
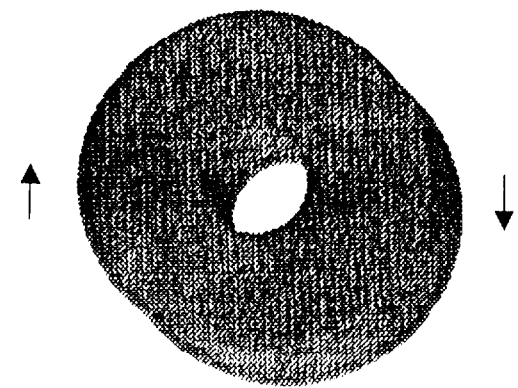
Figure 1B:
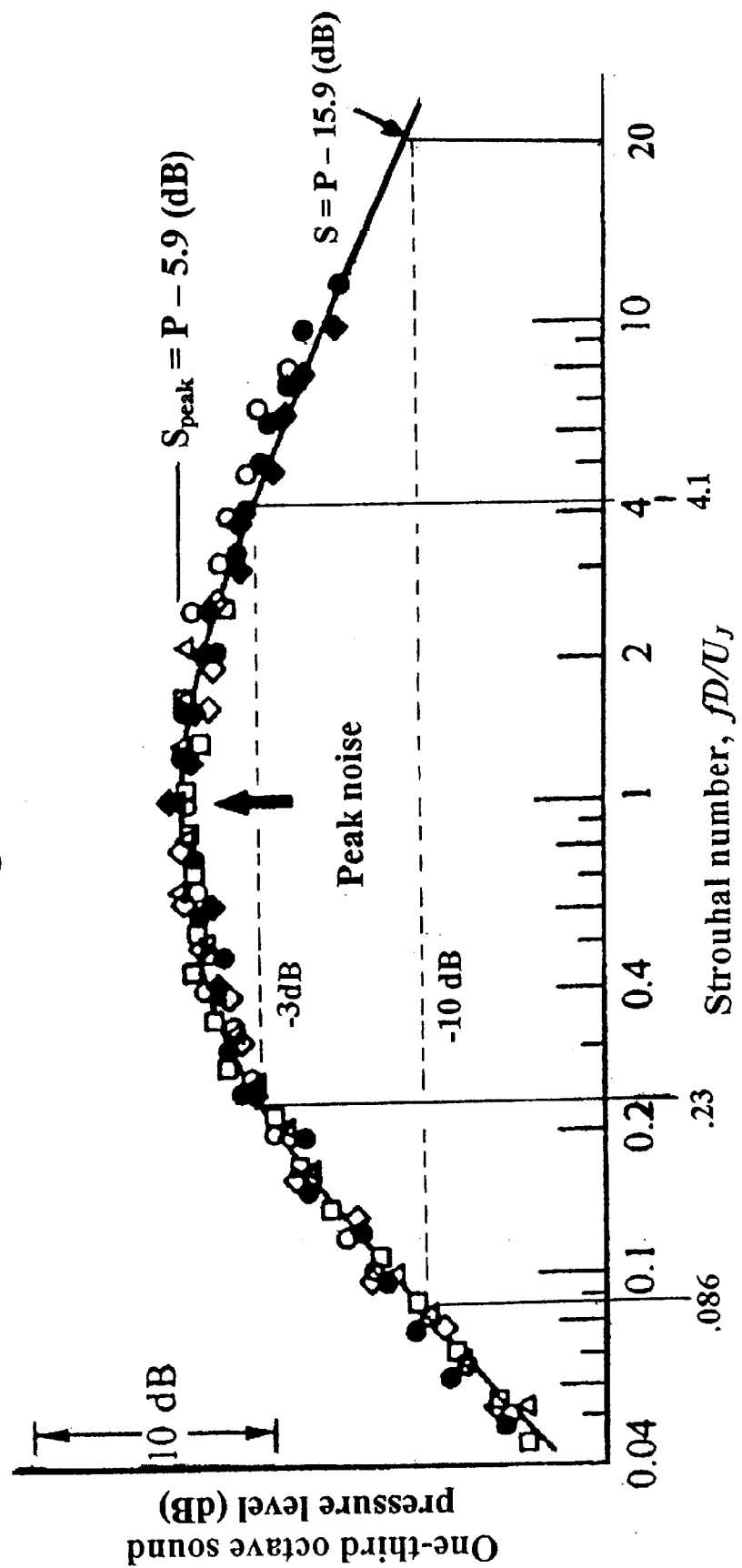
FIG. 1B shows the normalized spectrum of aerodynamically generated sound.
Figure 1C:
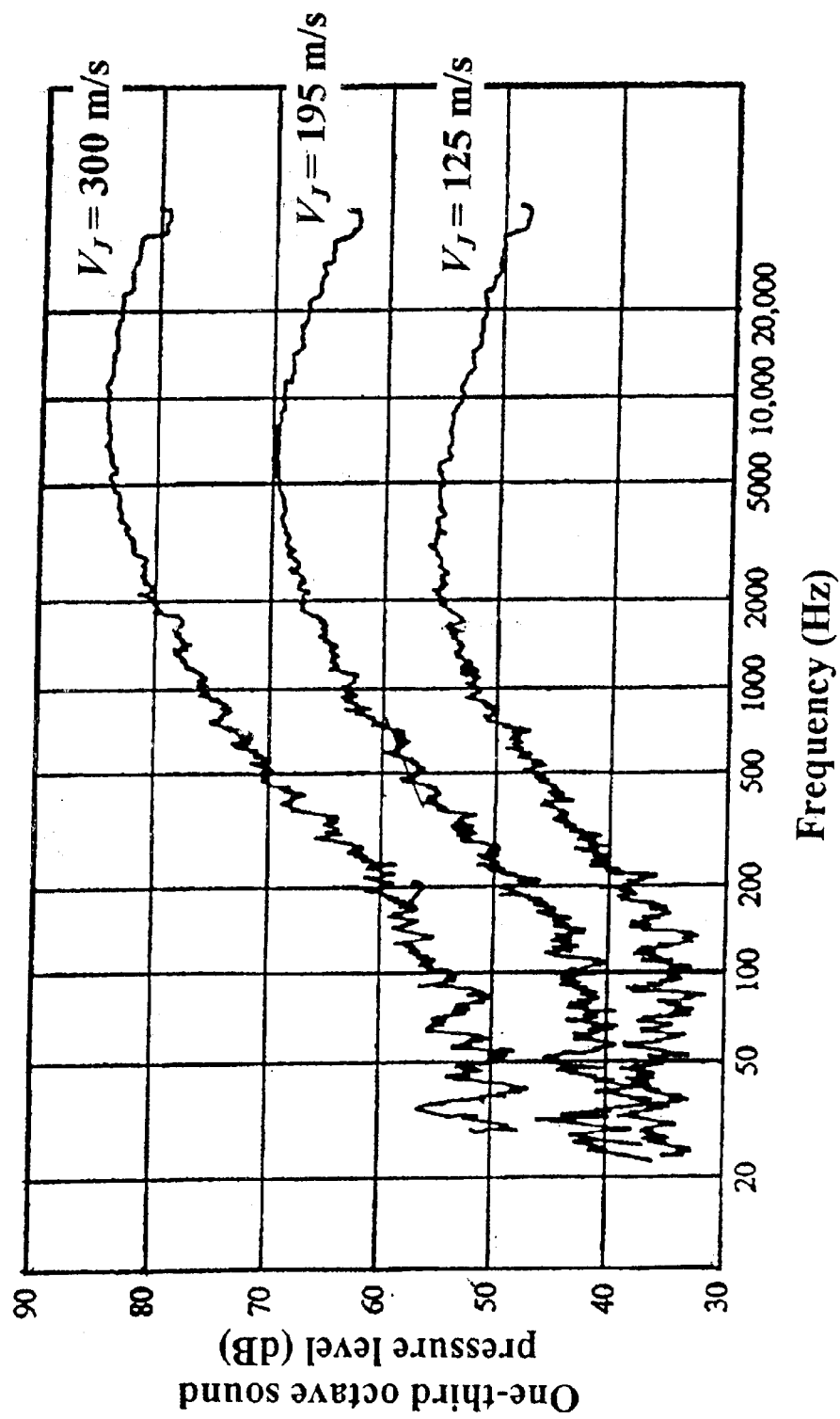
FIG. 1C is an illustration of spectra radiated by small jets in the laboratory.

The peak spectral density is found by assuming that the total radiated sound power P falls within the 3 dB points of the normalized spectrum in FIG. 1B. The 3 dB spectral width in Strouhal numbers is 3.87 so that the peak spectral density is (P−10 log 3.87), or (P−5.9)dB. The density at the −10 dB point is (P−15.9)dB, which corresponds to a Strouhal number of 20. Assuming a peak spectral frequency of 5 Hz, the (−10 dB) frequency is (20×5) or 100 Hz. As stated above, the rate at which sound pressure density decreases at high Strouhal numbers is 5 dB/octave. Since the Bragg frequency corresponding to X-band is about 20 kHz, which is separated from 100 Hz by 7.6 octaves, the radiated power density at 20 kHz is (7.6×5 db/octave), or 38 dB lower than that at the (−10 dB) frequency, i.e. 85.6 dB/Hz. This is the value of s used to compute S/N ratio.

In order that an aircraft having a speed of 500 kts receive a minimum 10 minute warning, CAT would have to be detected 83 miles away. Assume the CAT region is 100 miles away, that the airborne radar operates at 9 GHz, and that the antenna diameter is 1 m. Further assume 10 dB radar losses and a coherent acoustic length of 3 m (compared to a radar range bin size of 300 m). Thus, the radar parameters for calculating S/N are as follows:

$$FFT = 512, \, P_t = 100 \text{ w}, \, \tau_p = 2 \text{ us}, \, D = 300 \text{ m}, \, L_{coh} = 3 \text{ m},$$

$$\lambda_{RF} = 0.03 \text{ m}, \, N_o = 3.352 \times 10^{-21} \text{ w/Hz}, \, v_s = 300 \text{ m/s}, \, D_{ant} = 1 \text{ m},$$

$$R = 1.829 \times 10^5 \text{ m (100 nmi)}, \, s = 85.6 \text{ dB/Hz}, \, RadarLoss = 10 \text{ dB}.$$

Substituting:

$$[S/N]_o = 5.37 \times 10^5 = 57.3 \text{ dB}$$

If $L_{coh}$ were equal to 30 m instead of 3 m, then:

$$[S/N]_o = 67.3 \text{ dB}$$

The above S/N calculation assumes the FFT processing is coherent. This is true only if radar returns over the FFT data collection period are temporally correlated. This condition is met since, as stated above, quadrupole radiation at high acoustic frequencies is correlated for about a tenth of a second. Optimum processing requires the Doppler bin width to be comparable to or smaller than the Bragg bandwidth. The Bragg bandwidth $(v_s/L_{coh})$ is 100 Hz at 30,000 feet for an $L_{coh}$ of 3 m and 10 Hz for an $L_{coh}$ of 30 m. Hence the minimum FFT data collection times are 0.01 s for an $L_{coh}$ of 3 m and 0.1 s for an $L_{coh}$ of 30 m, both equal to or less than the 0.1 s correlation times of the radiating quadrupoles. There are operational advantages for keeping the FFT data collection period short. An FFT data collection period of 0.01 seconds reduces output S/N by 10 dB for an $L_{coh}$ of 30 m and 0 dB for an $L_{coh}$ of 3 m, in which case the output S/N is the same for both.

The highest backscatter Doppler frequency occurs when aircraft velocity and CAT flow are in opposite directions. CAT flow velocities can be as high as 100 m/s (200 kt) in which case the velocity of the higher Doppler can be as much as 400 m/s, to which must be added the speed of the aircraft (~250 m/s). At X-band this corresponds to a Doppler frequency of 46.7 kHz.

Pulse Doppler radars suffer from range-Doppler ambiguity. Target velocities are ambiguous when one cannot distinguish between the measured velocity and a higher velocity that has been aliased into the Nyquist interval ($-V_N$, $+V_N$). Range is ambiguous when one cannot distinguish which transmitted pulse is associated with an echo. If maximum unambiguous range is denoted by $R_M$, then the product of $R_M$ and $V_N$ is given by $(R_M V_N = c\lambda/8)$, where c is the velocity of light and $\lambda$ is the radar wavelength.

A detection PRF of 50 kHz, which corresponds to a Nyquist velocity of 375 m/s, allows ground clutter and both backscatter Dopplers to be detected unambiguously in the radar Doppler spectrum. Maximum unambiguous range, however, is only 3 km. Since CAT regions may extend for miles, the returns from multiple time round echoes will overlap, increasing CAT S/N noncoherently in each range bin.

Figure 3:
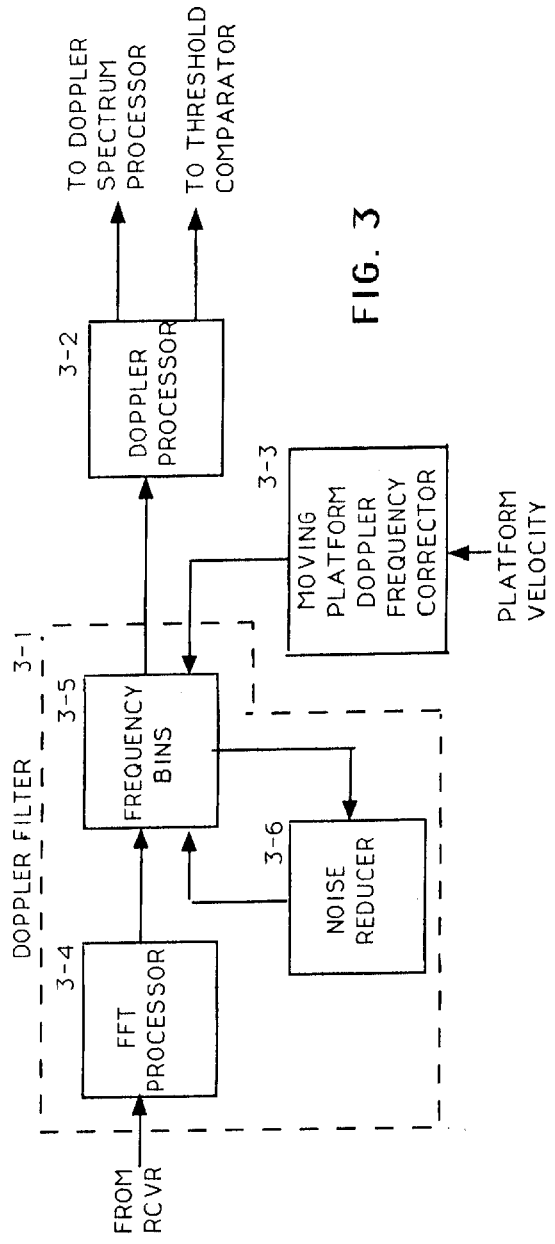
FIG. 3 is a block diagram of a Received Signal Processor.

Refer now to FIG. 3, wherein a block diagram of a processor that may be employed as the received signal processor 2-3 of FIG. 2 is shown. Signals detected by the receiver 2-2 are coupled to a Doppler filter 3-1 wherein the Doppler frequency shifts inherent in the received signal are extracted and coupled to a Doppler frequency processor 3-2. If the system is on a moving platform, such as on an aircraft, the Doppler frequencies determined in the filter 3-1 are corrected for the platform velocity by a moving platform Doppler frequency corrector 3-3 which couples correction signals to the filter for the removal of the Doppler frequency shifts due to the platform movement.

The filter 3-1 may comprise an FFT processor 3-4 which identifies the Doppler frequency signals in the radar backscatter. These Doppler frequency signals are coupled to a bank of frequency bins 3-5 and stored therein. If the system is on a moving platform, Doppler frequency correction signals from the frequency corrector 3-3 are respectively coupled to each bin in the frequency bank 3-5. This correction removes the Doppler frequency shifts caused by the platform movement so that the frequency of the signal in each bin is the Doppler frequency shift caused by the speed of sound. To optimize the detection of weak backscatter, the signals in the bins are coupled to a noise reducer 3-6 wherein a statistical test on the Doppler bin amplitudes is performed to identify Doppler bins containing only noise. The mean noise level is calculated for noise-only Doppler bins and this value is subtracted from the amplitude of the Doppler signal in each Doppler bin.

Figures 4, 5:
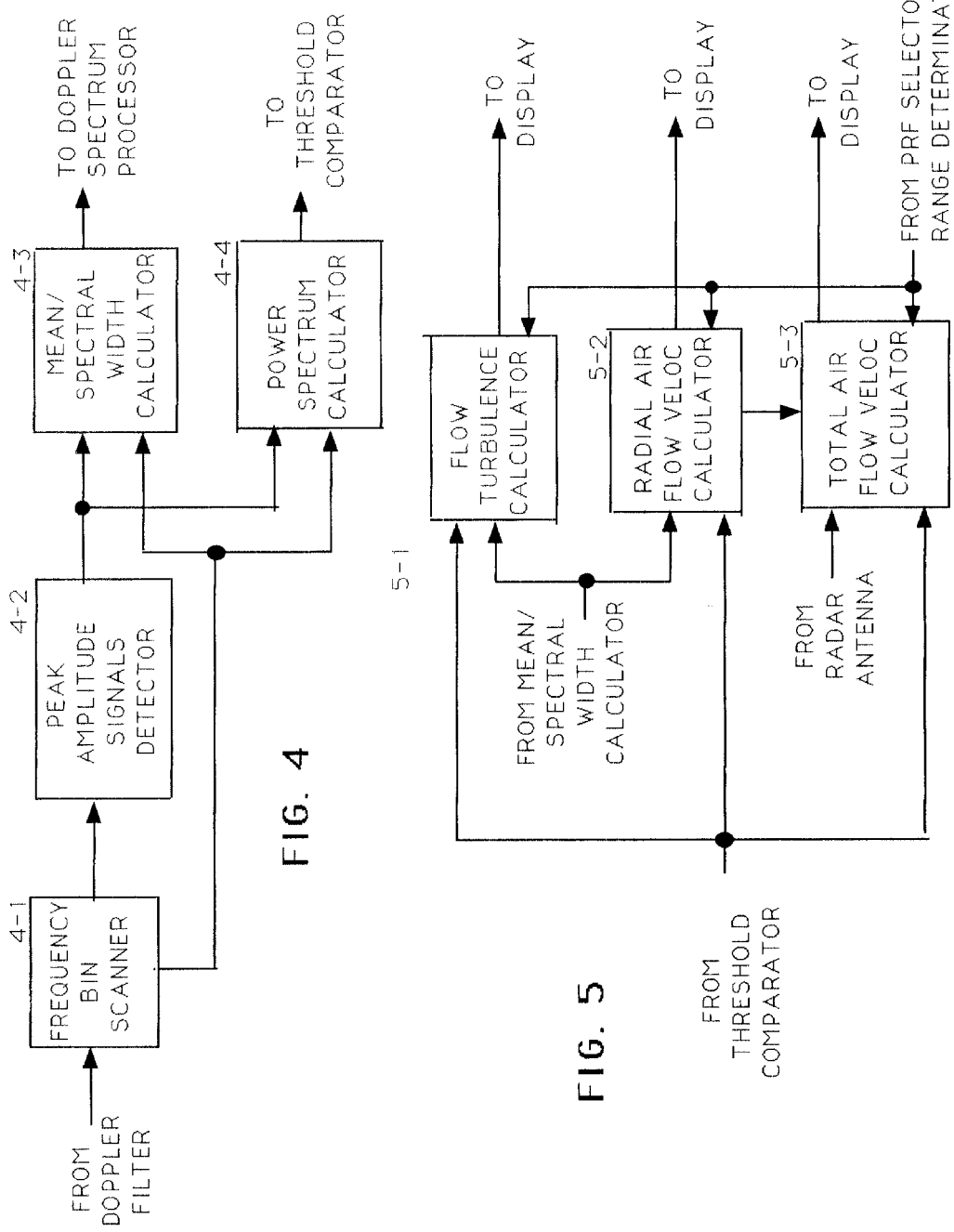
FIG. 4 is a block diagram of a Doppler Frequency Processor.
FIG. 5 is a block diagram of a Doppler Spectrum Processor.

Refer now to FIG. 4, wherein a block diagram of the Doppler signal processor 3-2 is shown. The frequency bins 3-5 are coupled to a peak amplitude signal selector 4-2 through a frequency bin scanner 4-1. The peak amplitude signal selector determines the Doppler signal amplitude in each frequency bin and identifies the bin having the peak amplitude in the vicinity of each of the two expected locations for acoustic backscatter. Signals in the bins having the identified peak amplitudes and non-zero amplitude signals in contiguous frequency bins around each peak amplitude bin are coupled to a mean/spectral width calculator 4-3 and to a spectrum power calculator 4-4. Mean/spectral width calculator 4-3 calculates the first moment (mean frequency) of the contiguous signals in each band and also the root mean square spectral width around each mean frequency. Since the backscatter is spread in Doppler by flow velocity fluctuations, the measured spectral width will in general be much wider than the minimum Bragg width so that the measured width is in fact a measurement of flow turbulence. Total signal power in each band is separately summed in spectrum power calculator 4-4. Each sum is coupled to the threshold comparator 2-4 and independently compared therein to a predetermined threshold. When the power of one or both backscatters exceed the threshold, a CAT alarm is activated in the cockpit. Antenna scanning in azimuth and elevation in the detection mode permits mapping the CAT angular extent which is displayed in the cockpit.

If only one threshold is exceeded, the spectral width around the detected mean Doppler frequency provides an estimate of velocity turbulence. If both thresholds are exceeded, the two measured Doppler frequency widths provide two independent estimates of turbulence which may be averaged together to improve accuracy.

Similarly, if only one threshold is exceeded, the detected mean Doppler frequency provides an estimate of (flow radial velocity±the speed of sound), where the sign depends on which of the two backscattered signals exceeded the threshold. The speed of sound may be computed from measured pressure and temperature, both of which are generally available on an aircraft. As a practical matter, the speed of sound varies minimally at 30,000 feet and is closely given by 300 m/s, which value can be used to compute the flow radial velocity using the above expression. If both thresholds are exceeded, one half the algebraic sum of the two mean Doppler frequencies provides a direct estimate of flow radial velocity. Flow radial velocity estimates obtained at two antenna azimuth pointing angles permits the calculation of total flow velocity and also flow angle with respect to the antenna boresight. Spectral width and the mean frequency in each band are coupled from mean/spectral width calculator 4-3 to the Doppler spectrum processor 2-5 for the determination of flow turbulence, radial air flow velocity, total air flow velocity and flow angle with respect to the antenna boresight.

Refer now to FIG. 5, wherein a block diagram of a Doppler spectrum processor which may be utilized as the Doppler processor 2-5 is shown. If only one threshold is exceeded, the threshold comparator 2-4 sends an enabling signal, enable 1, to a flow turbulence calculator 5-1, to which signals representative of the spectral width are also coupled from the mean/spectral width calculator 4-3. When the flow turbulence calculator 5-1 receives the enable 1 signal, it begins processing the representative spectral width signals to determine the degree of velocity turbulence. If both thresholds are exceeded, the threshold comparator 2-4 sends a second signal, enable 2, to turbulence calculator 5-1. Upon receipt of the enable 2 signal, the flow turbulence calculator 5-1 averages the two representative spectral width signals to determine the degree of velocity turbulence. Further, if only one threshold is exceeded, the threshold comparator 2-4 sends an enabling signal, enable 1, to a radial air flow velocity calculator 5-2. Upon receipt of the enable 1 signal, the radial flow velocity calculator 5-2 converts the mean frequency $f_m$, coupled from the mean/spectral width calculator 4-3, to a velocity $V_r$ by solving the equation $V_r=\lambda_{RF}f_m/2$, where $\lambda_{RF}$ is the wavelength of the radar frequency. The radial flow velocity $v_r$ is obtained by adding 300 m/s to $V_r$ if $V_r$ is less than 300 m/s or subtracting 300 m/s if $V_r$ is greater than 300 m/s. If both thresholds are exceeded, the threshold comparator 2-4 sends an enabling signal, enable 2, to the radial air flow velocity calculator 5-2. Upon receipt of the enable 2 signal, the radial flow velocity calculator 5-2 algebraically sums the two mean frequencies $f_{1m}$ and $f_{2m}$ coupled from the mean/spectral width calculator 4-3 and converts the sum to radial air flow velocity $v_r$ by solving the equation $v_r=\lambda_{RF}(f_{1m}+f_{2m})/4$, where $\lambda_{RF}$ is the wavelength of the radar frequency.

Figure 7:
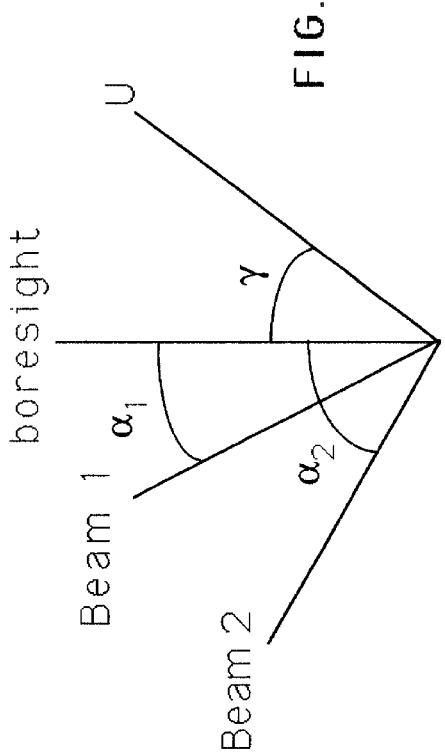
FIG. 7 is a diagram useful for explaining total air flow estimation from two radar beams offset from an antenna boresight.

Estimates of total air flow may be acquired from estimates of radial air flow estimated from data obtained with two radar beam angles, $\alpha_1$ and $\alpha_2$, with respect to the antenna boresight as shown in FIG. 7. Estimates of radial air flow velocity $v_{1r}$ and $v_{2r}$, obtained at antenna azimuth angles $\alpha_1$ and $\alpha_2$, respectively, are coupled from radial air flow velocity calculator 5-2 to total air flow velocity calculator 5-3 wherein the total air flow velocity U and the flow velocity angle $\gamma$ with respect to the boresight are calculated by solving the following equations:

$$U=\tfrac{1}{2}\{[(v_{1r}+v_{2r})/\cos \tfrac{1}{2}(\alpha_1-\alpha_2)]^2+[(v_{1r}-v_{2r})/\sin \tfrac{1}{2}(\alpha_1-\alpha_2)]^2\}^{1/2}$$

$$\gamma=\cos^{-1}(v_{1r}/U)-\alpha_1$$

Figure 6:
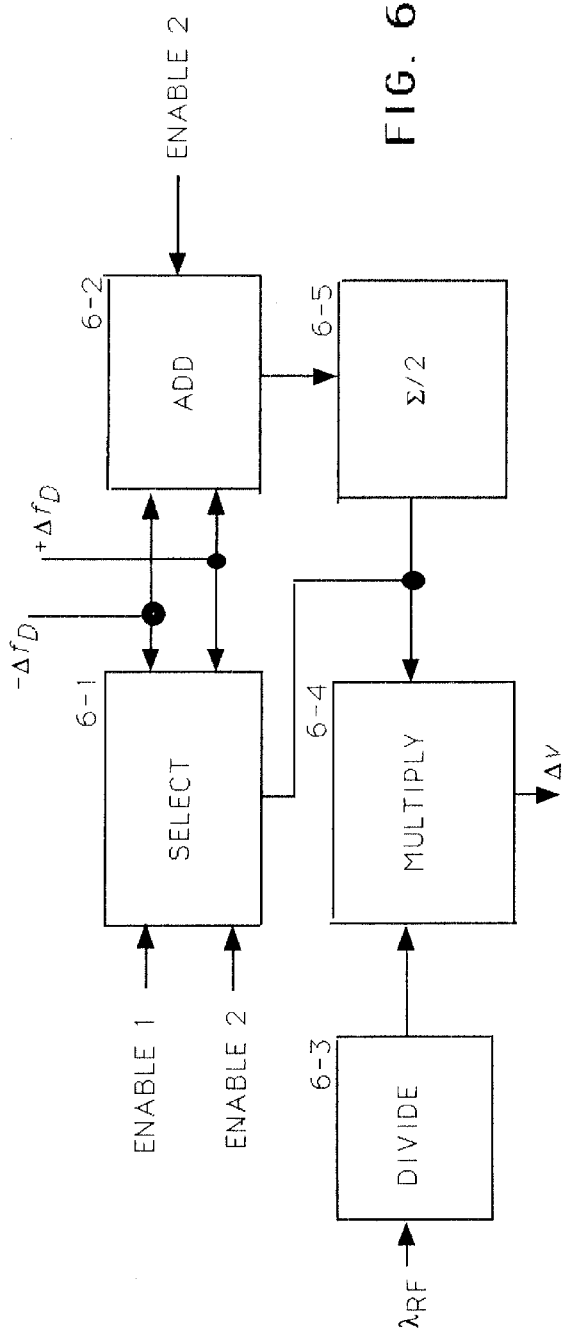
FIG. 6 is a block diagram of a processor which may be employed as the flow turbulence calculator of FIG. 5.

A processor which may be utilized for converting the spectral width signals to the degree of turbulence is shown in FIG. 6. If enable 1 is received by the flow turbulence calculator 5-1, an enable signal is coupled to a Doppler band selector 6-1 wherein a selection is made between the bandwidths $+\Delta f_D$ and $-\Delta f_D$ coupled from the spectral width calculator 4-3. Selector 6-1 selects that bandwidth having the greater signal power and couples it to a multiplier 6-4. Multiplier 6-4 also receives one-half of the radar operating wavelength from a divider 6-4 and multiplies the selected Doppler bandwidth by one-half of the radar operating wavelength to provide a degree of turbulence Δv. If selector 6-1 receives both enable 1 and enable 2, it is disabled. The bandwidths, +Δf$_D$ and −Δf$_D$, are also coupled to an adder 6-2 wherein they are summed when enable 2 is received. This sum is coupled to divider 6-5 wherefrom the average value of the two bandwidths is coupled to multiplier 6-4 wherein the average value is multiplied by one-half the radar operating wavelength to obtain the degree of turbulence Δv.

Output S/N will be reduced if the CAT volume does not fill the radar beam. This is most likely to occur in elevation. For example, if the CAT region occupies only one-quarter of the radar beam in elevation at 100 miles range (~4500 feet), S/N will be reduced by 6 dB, which will have a relatively small effect on CAT detectability.

To determine range to the CAT region, the radar may operate sequentially at two reduced PRFs, each having unambiguous ranges less than 100 miles. These PRFs may have a ratio of 3 to 4 to enable the computed unambiguous range to be over 100 miles in a manner well known to those versed in the art. The first PRF may be 2220 pulses per second, which has an unambiguous range of 67.6 km (37.5 nm) and a corresponding Nyquist interval of ±15.53 m/s. Radar backscatter at the speed of sound at 30,000 feet (300 m/s) will alias into the Nyquist interval at ±10.6 m/s which is well separated from ground clutter.

The second PRF may be 4/3 times the first, or 2960 pulses per second, which has an unambiguous range of 50.7 km (28.2 nm) and a corresponding Nyquist interval of ±20.7 m/s. In this case backscatter will alias into the Nyquist interval at ±10.2 m/s. The computed maximum unambiguous range from the two range measurements is (3×67.6 km) or 202.8 km (112.6 nm).

Operating at reduced PRFs during ranging requires the FFT size to be decreased from 512 to 128. The time to collect 128 returns for a PRF of 2220 is 0.058 seconds and 0.043 seconds for a PRF of 2960. Both are shorter than the quadrupole correlation times. The shorter FFTs reduce S/N by 6 dB. To accommodate the increased data collection times, the antenna scan rate must be reduced by a factor of 10 during ranging.

For a given radar power-aperture product, ground-based radar will experience a sharp detectability threshold as a function of flow velocity due to the eighth power dependence of radiated acoustic power on flow velocity. The probability of detection also varies with radar carrier frequency as shown by the following two tables, each of which displays: (i) radar operating frequency, (ii) corresponding Bragg acoustic frequency, (iii) radiated power density at the Bragg frequency, (iv) spatial separation of quadrupoles radiating at the Bragg frequency, (v) atmospheric attenuation at the Bragg frequency, and (vi) average acoustic attenuation in the space between quadrupoles. Table A has been computed for a flow velocity of 20 m/s and Table B for a flow velocity of 10 m/s.

TABLE A (Flow Velocity = 20 m/s)

| Radar Freq MHz | Bragg Freq kHz | Radiated Pwr Density dB/Hz | Quadruple Spacing meters | Acoustic Attenuation dB/100 m | Avg Acoustic Attenuation dB |
|---|---|---|---|---|---|
| 449 | 1 | 90.0 | 14 | 0.43 | 0.03 |
| 915 | 2 | 84.5 | 20 | 1.2 | 0.12 |
| 2800 | 6 | 75.8 | 37 | 8.6 | 1.6 |
| 5000 | 11 | 70.9 | 53 | 15.5 | 4.1 |
| 9300 | 20 | 66.2 | 72 | 38 | 13.7 |

TABLE B (Flow Velocity = 10 m/s)

| Radar Freq MHz | Bragg Freq kHz | Radiated Pwr Density dB/Hz | Quadruple Spacing meters | Acoustic Attenuation dB/100 m | Avg Acoustic Attenuation dB |
|---|---|---|---|---|---|
| 449 | 1 | 60.5 | 40 | 0.43 | 0.09 |
| 915 | 2 | 55.0 | 59 | 1.2 | 0.35 |
| 2800 | 6 | 46.2 | 109 | 8.6 | 4.7 |
| 5000 | 11 | 41.4 | 152 | 15.5 | 11.7 |
| 9300 | 20 | 36.7 | 212 | 38 | 40.3 |

The average acoustic attenuation, which is a function of both quadrupole spacing and atmospheric acoustic attenuation, determines whether the flow volume is filled with overlapping Bragg acoustic waves. Using this criterion, Table B shows that radar frequencies up through 915 MHz may be used by a sufficiently sensitive ground-based radar to detect acoustic backscatter from a 10 m/s flow. Applying the same criterion, Table A shows that radar frequencies up through S-band may be used by a sufficiently sensitive ground-based radar to detect acoustic backscatter from a 20 m/s flow. Since the power density radiated by a 10 m/s flow is about 30 dB less than that radiated by a 20 m/s flow at all radar frequencies, a much more sensitive radar is required to detect the lower flow velocity.

Most wind profiler radars of the prior art operate at 915 MHz or below. These radars measure wind velocity by integrating clear air backscatter for up to two minutes to obtain sufficient S/N ratio. This severely limits data rate and accuracy. RASS wind profiler radars measure the virtual temperature profile of the atmosphere by simultaneously radiating a narrow band of acoustic signals around the Bragg wavelength. In practice, maximum RASS range is reduced by strong crosswinds which blow the acoustic waves out of the radar beam.

A sufficiently sensitive wind profiler radar with a vertical and 2 canted antenna beams can simultaneously collect backscatter from clear air as well as from flow generated sound, since each return falls into a different portion of the Doppler spectrum. The present As invention utilizes signals backscattered from flow generated sound at each of two Doppler frequencies in each of the three antenna beams to measure (i) the virtual temperature profile of the atmosphere, (ii) vertical wind velocity, and (iii) horizontal wind velocity and direction.

The Doppler frequencies for acoustic backscatter are approximately ±2 kHz for a radar operating at 915 MHz. Hence a PRF of 6.9 kHz permits unambiguous detection of both backscatter Doppler frequencies. This PRF provides a maximum unambiguous range of 21.8 km, which is operationally acceptable. The time to collect 2048 samples for FFT processing is about 0.3 seconds, which is comparable to quadrupole correlation times. Non-coherent integration of 33 Doppler spectra increases S/N ratio. This results in an antenna dwell in each beam of 10 seconds, which is operationally acceptable.

One-half the algebraic sum of the two mean Doppler frequencies in the vertical beam yields an estimate of vertical flow velocity. The relative magnitude of the two Doppler frequencies yields the direction of the vertical velocity. One-half the algebraic difference between the two mean Doppler frequencies yields an estimate of the speed of sound. A virtual temperature profile of the atmosphere can be calculated from the estimates of vertical air flow velocity and the vertical speed of sound in each range bin in a manner well-known to those versed in the art. Similar measurements provide an estimate of the radial air flow velocity in each of the two canted antenna beams. Measurement of the radial flow velocity in all three beams permits the computation of horizontal flow velocity and direction in a manner well-known to those versed in the art.

Every aircraft creates a pair of horizontal, counter-rotating, cylindrical, trailing wake vortices as a direct consequence of generating lift. A wake vortex is structurally similar to an eddy. It takes several seconds for a wake vortex to fully form behind an aircraft. Measurements show that the core remains relatively intact until the vortex breaks up. The maximum tangential velocity along streamlines is slightly less than one-half the aircraft speed. Also, a vortex diameter is about three-quarters the wingspan of an aircraft.

Vortices typically descend after generation and, upon reaching the ground, move in opposite directions. Their trajectories, however, may be greatly altered by crosswinds. Wake vortices may be as large as 45 m in diameter, may last up to several minutes, are invisible to the naked eye, and cannot be detected by conventional radar means. As stated above, wake vortices have been detected by RASS, which requires simultaneous radar and acoustic radiation.

At present, mandated in-trail minimum separations between aircraft in landing and takeoff corridors are based on worst case vortex persistence and strength in the corridor, significantly reducing airport capacity. Experimental data indicate that in-trail separations may be safely reduced most of the time if vortices could be tracked and vortex strength measured in real-time.

Human observers on the ground often hear a whooshing sound as a wake vortex passes overhead, that appears to be due to turbulent flow within the vortex. To detect the sound generated by wake vortices, the radar may operate at 915 MHz and radiate 2 us pulses. The radar antenna may be positioned underneath the landing and/or departure corridor, close to the point where each corridor intersects the ground. The radar antenna beam(s) point up the corridor, typically 3 degrees for the arrival corridor. A 6 degree vertical beamwidth minimizes ground clutter return. As previously noted, ground clutter return is far removed from the acoustic backscatter Doppler frequency.

The radar antenna may consist of a 1.4 degree azimuthal array that is azimuthally steered in 1.4 degree steps. The range bin size may be 300 meters. As the antenna scans, radar acoustic backscatter from quadrupole radiation may be mapped as a function of range and azimuth. Radar acoustic reflection can occur only when the vortex is within the radar beam since only then will quadrupole radiated acoustic wavefronts be parallel to the impinging radar wavefronts.

A radar PRF of 6 kHz corresponds to a maximum unambiguous range of about 25 km, or 7.5 nm. Alternating a second PRF of 4.5 kHz with the first extends the maximum unambiguous range to 22.5 nm in a manner well known to those versed in the art. The time to collect 512 FFT samples is 0.085 seconds for the first PRF and 0.114 seconds for the second. Taking into account quadrupole correlation times, five spectra are non-coherently integrated at each PRF to increase S/N. During each one second antenna dwell time, a vortex moves about one-half beamwidth in a crosswind of 5 m/s at a minimum range of 400 m. The accompanying loss in S/N is acceptable since radar power density is highest at short ranges.

Doppler bin widths at each PRF are 11.8 Hz and 8.8 Hz, respectively. The spectral width of the acoustic backscatter is a measure of vortex flow velocity spread. Doppler width may be converted into vortex strength through calibration.

It has been shown that vortices outside a corridor guard band 90 m wide centered on the extended runway centerline do not present a threat to aircraft in the corridor. To search the guard band for vortices beginning at a minimum range of 400 m, the antenna may scan ±6.4 degrees in azimuth using 9 azimuth beam dwell positions, in which case the time to complete one antenna scan is about 9 seconds. The search width at longer ranges is much greater than the guard band.

When scanning in the antenna boresight dwell position, the radar may also search for echoes from aircraft within the corridor in a manner well-known to those versed in the art. A determination may be made from the measured range and speed of every detected aircraft whether it may be in danger from hazardous vortices. Aircraft determined to be in danger may be alerted to take evasive action via existing ground-air communications in a manner well-known to those versed in the art.

While the invention has been described in its preferred embodiments, it is understood that the words that have been used are words of description rather than limitation and that changes may be made within the purview of the appended claims without departing from the true scope and spirit of the invention in its broader aspects.

I claim:

1. A sensor of atmospheric turbulent flows having a radar transmitter and a radar receiver positioned and arranged to receive radar signal reflections of the transmitted radar signals from atmospheric refractive index variations induced by acoustic waves that are aerodynamically generated by the atmospheric turbulent flows, thereby providing received radar signals, comprising:

a signal processor coupled to said radar receiver wherein said received radar signals are processed to select at least one band of signals at Doppler shifted frequencies, thereby providing at least one Doppler frequency band, to estimate spectral width and mean frequency of said at least one Doppler frequency band, and to estimate signal power in said at least one Doppler frequency band; and a spectrum processor coupled to said signal processor for processing said spectral width and mean Doppler frequency of said at least one Doppler frequency band to provide an estimate of atmospheric flow turbulence and radial flow velocity.

2. A sensor in accordance with claim 1 further including a threshold comparator coupled to said signal processor to compare signal power of said at least one Doppler frequency band to a predetermined power level and coupled to said spectrum processor to provide an enable signal thereto when said signal power exceeds said predetermined power level.

3. A sensor in accordance with claim 2 further including a pulse repetition rate (PRF) selector coupled to said radar transmitter, said radar receiver, and said threshold comparator to select at least one PRF, in response to said enable signal, to provide an unambiguous range measurement to said refractive index variations, thereby providing an unambiguous range measurement to said atmospheric turbulent flows.

4. A sensor in accordance with claim 1 wherein said radar transmitter includes a radar antenna and said spectrum processor includes:

a radial air flow velocity calculator coupled to said radar receiver to provide first and second estimates of radial atmospheric flow velocity; and a total air flow velocity calculator coupled to receive said first and second estimates of radial flow velocity and to said radar antenna to receive beam position angles corresponding respectively to said first and second estimates of said radial flow velocity to provide an estimate of total atmospheric air flow velocity and angle off boresight thereof.

5. A sensor in accordance with claim 1 wherein said signal processor estimates a first spectral width, a second spectral width, a first mean frequency, and a second mean frequency of first and second frequency bands, respectively, when two Doppler frequency bands comprise said at least one Doppler frequency band, obtains an average spectral width of said first and second bands, obtains an algebraic sum of said first mean frequency and said second mean frequency, and couples said average spectral width and said algebraic sum to said spectrum processor for utilization to provide estimates of atmospheric flow turbulence and radial flow velocity of said atmospheric turbulent flows.

6. A sensor in accordance with claim 1 wherein said signal processor comprises:

a Doppler filter coupled to said radar receiver wherein signals at Doppler shifted frequencies are extracted from said received radar signals;

a Doppler processor coupled to said Doppler filter for processing said Doppler shifted frequencies to estimate said spectral width, said mean frequency, and said signal power.

7. A sensor in accordance with claim 6 wherein said Doppler filter includes a fast Fourier transform (FFT) processor coupled to said radar receiver to extract Doppler frequency signals from said received radar signals.

8. A sensor in accordance with claim 6 wherein said Doppler filter includes a bank of frequency bins coupled to said Doppler processor wherein extracted Doppler frequency signals are stored in respective frequency bins.

9. A sensor in accordance with claim 8 wherein said Doppler filter further comprises a noise reducer coupled to said frequency bins for reducing noise in said frequency bins.

10. A sensor in accordance with claim 9 wherein said noise reducer tests signal amplitudes in each frequency bin, identifies frequency bins containing only noise, determines a noise level mean value for noise only bins, and subtracts said mean value from amplitudes of signals in each of said frequency bins.

11. A sensor in accordance with claim 8 wherein said Doppler processor includes:

a scanner coupled to scan through said bank of frequency bins;

a signal amplitude detector coupled to said scanner to estimate amplitudes of signals stored in said frequency bins and select signals in frequency bins having signal amplitudes greater than signal amplitudes in other bins;

a spectral calculator coupled to said scanner and said signal amplitude detector to estimate said spectral width and said mean frequency; and a power calculator coupled to said scanner and to said signal amplitude detector for estimating said signal power.

12. A sensor in accordance with claim 11 further including a threshold comparator coupled to said power calculator to compare said signal power to a predetermined power level and provide an enable signal when said signal power exceeds said predetermined power level, said enable signal coupled to activate said spectrum processor.

13. A sensor in accordance with claim 12 further including a range determinator and a pulse repetition rate (PRF) selector, said PRF selector coupled to said radar transmitter, said radar receiver, and said threshold comparator to select at least one PRF, in response to said enable signal, said at least one PRF selected such that said range determinator provides an unambiguous range measurement to said refractive index variations and thereby to said atmospheric turbulent flows.

14. A sensor in accordance with claim 13 wherein said radar transmitter includes a radar antenna and further including a display, said display coupled to said radar antenna, to said spectrum processor, and to said range determinator to present locations of said atmospheric turbulent flows.

15. A sensor in accordance with claim 13 wherein said range determinator comprises:

a multiplicity of range bins;

a range bin selector wherein Doppler shifts caused by approaching and receding acoustic waves are detected;

a second range bin selector wherein only Doppler shifts caused by approaching acoustic waves are detected; and a third range bin selector wherein only Doppler shifts caused by receding acoustic waves are detected;

thereby establishing range to and extent of said turbulence.

16. A sensor in accordance with claim 11 wherein said spectrum processor includes a flow turbulence calculator coupled to said spectral calculator to receive and process said spectral width and provide an estimate of turbulence of said atmospheric turbulent flows.

17. A sensor in accordance with claim 16 wherein said flow turbulence calculator comprises:

a selector coupled to said spectral calculator and to said threshold comparator to receive first and second enable signals and signals within first and second bandwidths, said selector enabled to select that bandwidth having greater signal power upon receipt of said first enable signal and is disabled upon receipt of said second enable signal;

an adder coupled to said spectral calculator and to said threshold comparator to receive signals within said first and second bandwidths and said second enable signal to provide a sum of said first and second bandwidths upon receipt of said second enable signal;

a divider coupled to said adder to provide an average of said first and second bandwidths; and a multiplier coupled to said selector, said divider, and to receive a signal representative of one-half wavelength of said transmitted radar signal to multiply said bandwidth received from said selector by said one-half wavelength when said first enable signal is received by said selector and to multiply said average of said first and second bandwidths by said one-half wavelength when said adder receives said second enable signal, said multiplications providing said estimate of turbulence of said atmospheric turbulent flows.

18. A sensor in accordance with claim 6 wherein said signal processor further includes a moving platform Doppler frequency corrector coupled to said Doppler filter to remove Doppler frequency shifts caused by a moving platform.

19. A method for determining air flow turbulence and flow velocity of atmospheric turbulent flows from radar signals reflected from atmospheric refractive index variations induced by acoustic waves that are aerodynamically generated by the atmospheric turbulent flows comprising the steps of:

providing an antenna, having a boresight for transmitting radar signals and receiving said reflected radar signals;

processing said reflected radar signals received at said antenna to select at least one band of signals at Doppler shifted frequencies, thereby providing at least one Doppler shifted frequency band;

deriving estimates of spectral width, mean frequency, and signal power of said at least one Doppler shifted frequency band; and utilizing said spectral width, said mean frequency, and said signal power to derive estimates of said air flow turbulence and radial air flow velocity.

20. The method of claim 19 further including the step of comparing said signal power to a predetermined power level and providing an enable signal to activate said utilizing step when said signal power exceeds said predetermined power level.

21. The method of claim 19 wherein the utilizing step includes the steps of:

estimating a first spectral width and a second spectral width, a first mean frequency and a second mean frequency of first and second Doppler shifted frequency bands, respectively, when two Doppler frequency bands comprise said at least one Doppler frequency band;

averaging said first and second spectral widths to obtain an average spectral width;

algebraically summing said first and second mean frequencies to obtain an algebraic sum thereof; and employing said average spectral width and said algebraic sum to provide estimates of air flow turbulence and radial flow velocity of said atmospheric turbulent flows.

22. The method of claim 19 wherein the processing step includes the steps of:

extracting Doppler shifted frequencies from said reflected radar signals received at said antenna;

storing said Doppler shifted frequencies in frequency bins;

scanning said frequency bins to select signals in frequency bins having signal amplitudes that are greater than signal amplitudes in other bins, thereby providing selected signals;

estimating spectral width and mean frequency of said selected signals; and estimating signal power of said selected signals.

23. The method of claim 22 further including the steps of:

testing signal amplitudes in each frequency bin;

identifying frequency bins containing only noise;

estimating a mean noise level value for noise only bins; and subtracting said mean noise level value from signal amplitudes in each frequency bin.

24. The method of claim 22 further including the step of removing Doppler frequency shifts caused by a moving platform from said Doppler shifted frequencies.

25. The method of claim 22 further including the steps of:

modulating said transmitted radar signals to provide a pulse modulated radar signal;

selecting at least one pulse repetition rate for said pulse modulated radar signal for measuring unambiguous range within a predetermined range interval.

26. The method of claim 22 further including the steps of;

providing a multiplicity of range bins;

selecting a range bin wherein Doppler shifts caused by approaching and receding acoustic waves are detected;

selecting a second range wherein only Doppler shifts caused by approaching acoustic waves are detected; and selecting a third range bin wherein only Doppler shifts caused by receding acoustic waives are detected;

thereby establishing range to and extent of said turbulence.

27. The method of claim 19 further including the steps of:

providing first and second estimates of radial air flow velocity at first and second radial positions, respectively; and using said first and second estimates of radial air flow velocity and said first and second radial positions to obtain an estimate of total air flow velocity and flow velocity angle with respect to said boresight.

28. The method of claim 19 wherein said utilizing step includes the steps of:

providing a first enable signal when said at least one Doppler shifted frequency band comprises a first bandwidth of frequencies having signal power exceeding a predetermined threshold and a second enable signal when said at least one band comprises first and second bandwidths of frequencies each having signal power exceeding said predetermined threshold;

selecting between said first and second bandwidths that bandwidth having greater signal power when said first enable signal is provided to obtain a selected bandwidth;

averaging said first and second bandwidths when said second enable signal is provided to obtain an average bandwidth;

multiplying said selected bandwidth by one-half wavelength of said radar signals when said first enable signal is provided and multiplying said average bandwidth by said one-half wavelength when said second enable signal is provided to obtain an estimate of said air flow turbulence.

* * * * *